Figure 1:
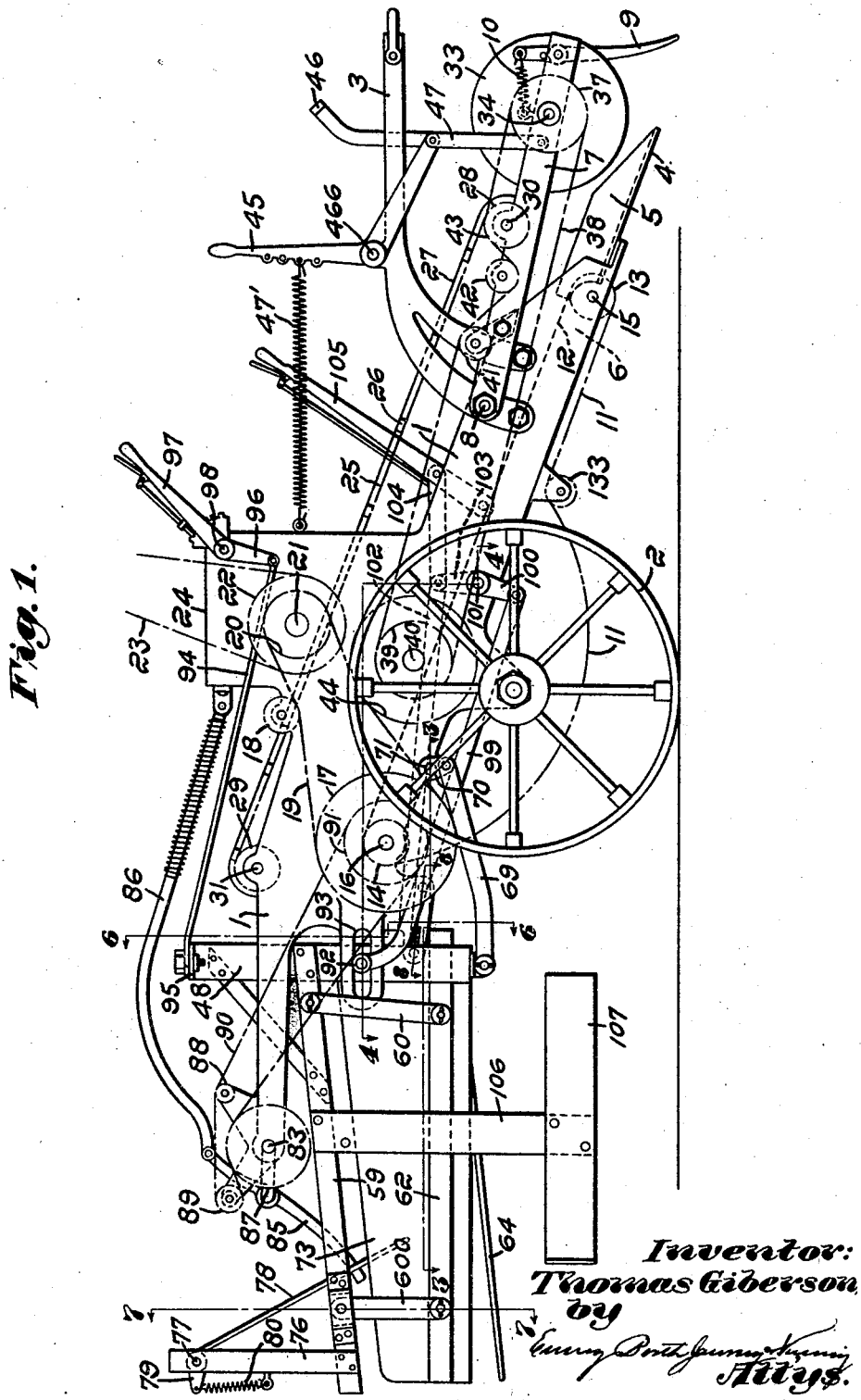

Sept. 25, 1928.

T. GIBERSON 1,685,230

POTATO DIGGER

Filed April 16, 1926

4 Sheets-Sheet 1

Inventor:
Thomas Giberson
by
Attys.

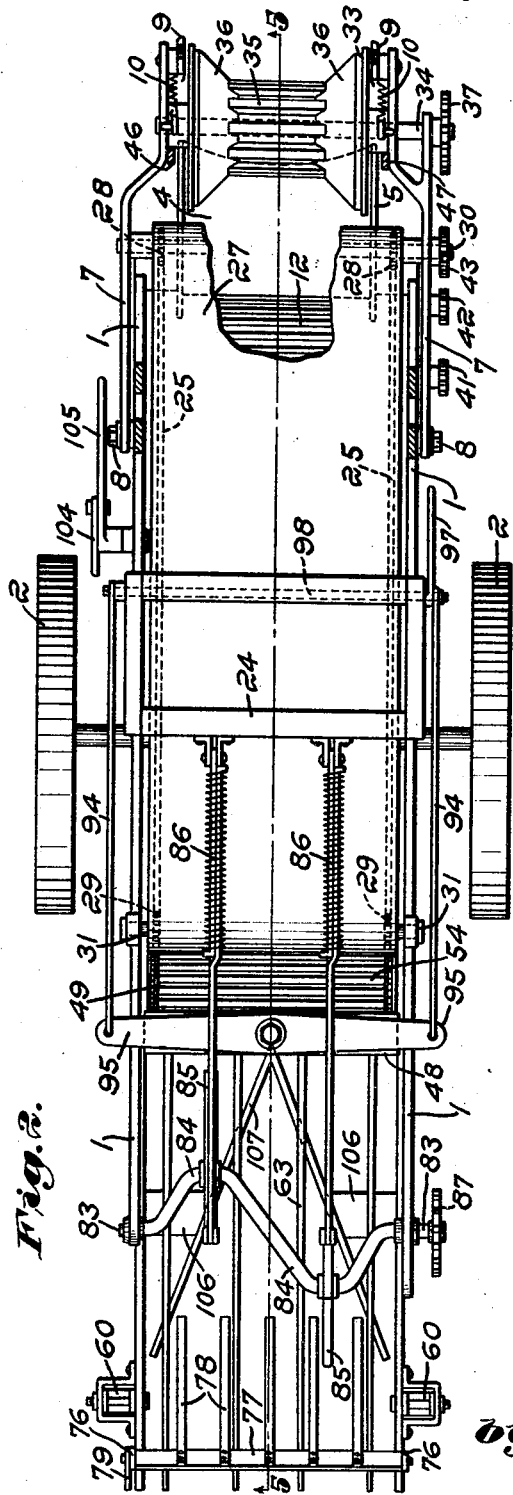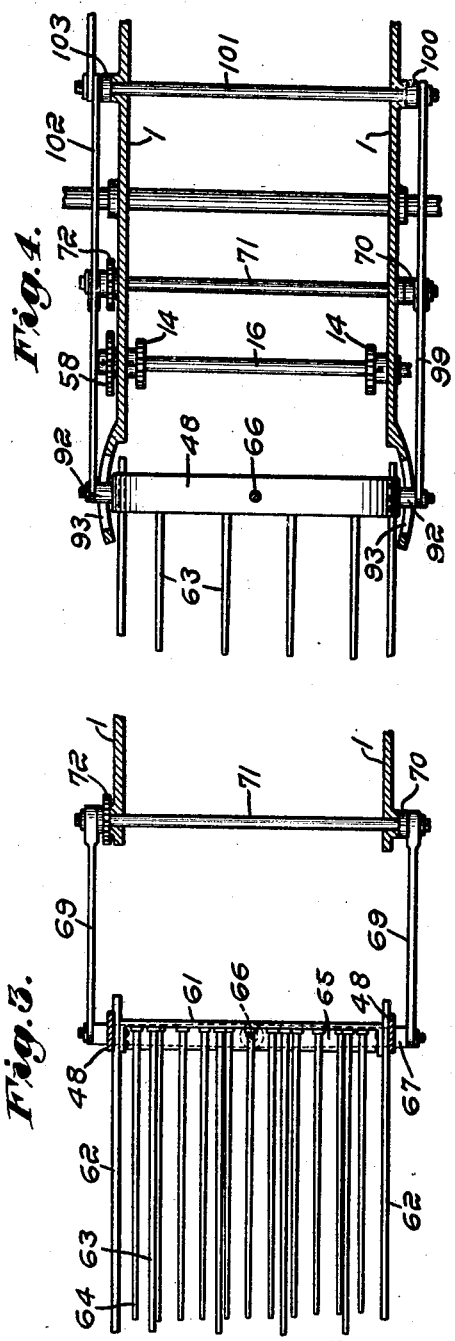

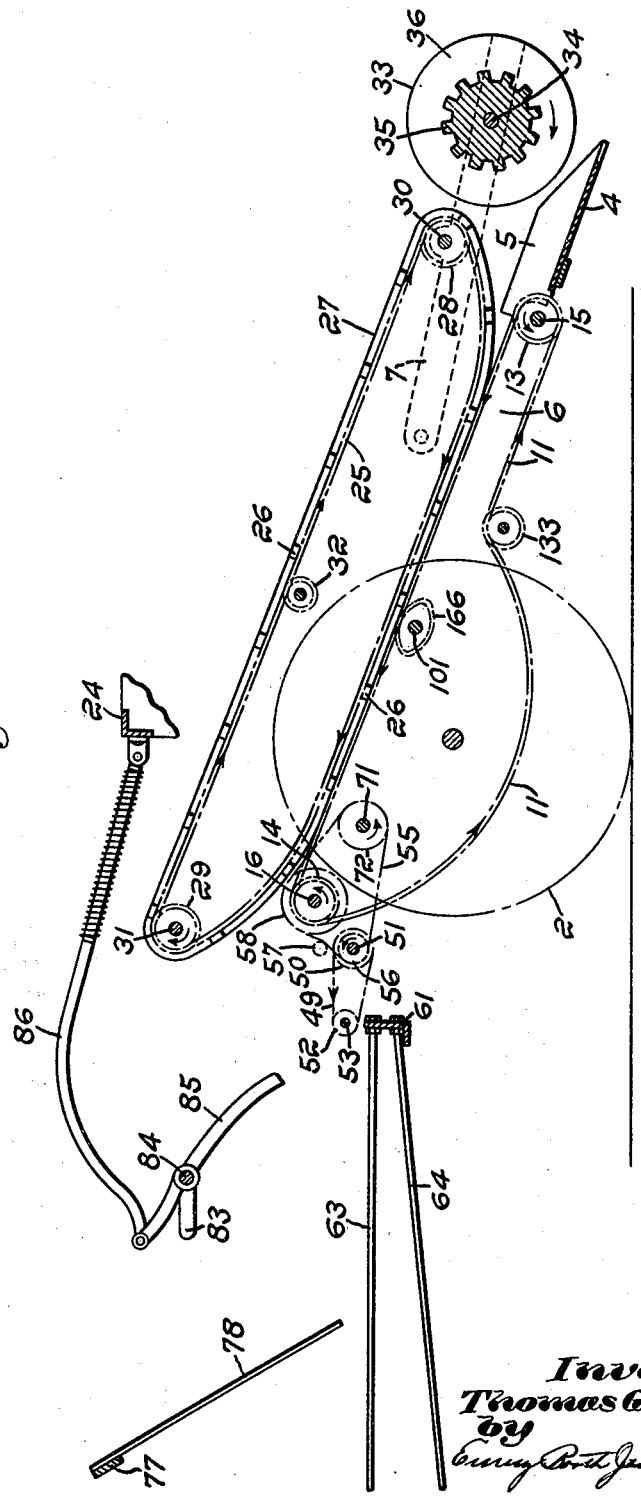

Sept. 25, 1928.
T. GIBERSON
POTATO DIGGER
Filed April 16, 1926
1,685,230
4 Sheets-Sheet 4
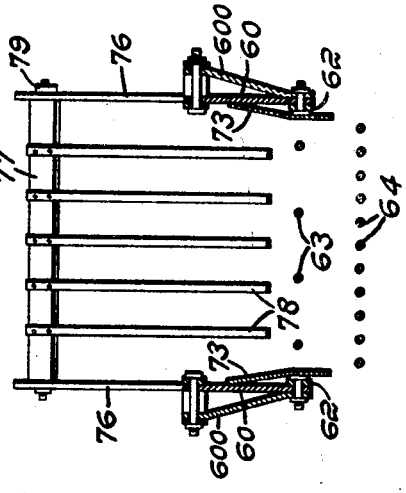
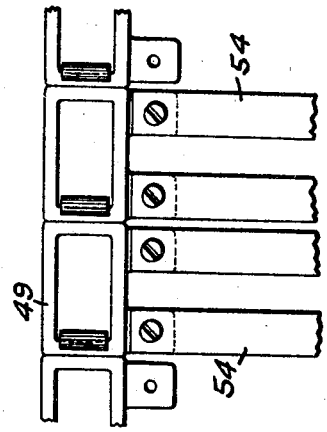
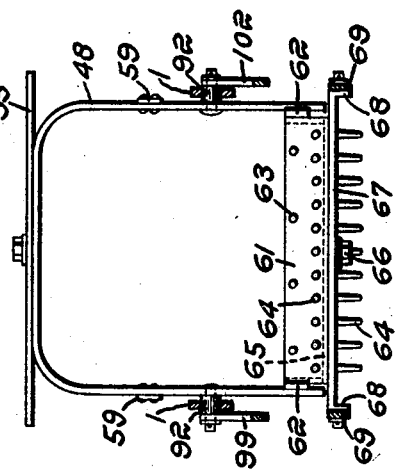
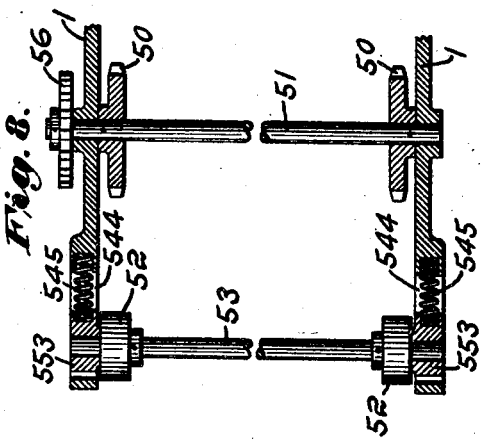
Inventor:
Thomas Giberson, Patented Sept. 25, 1928.

1,685,230

UNITED STATES PATENT OFFICE.

THOMAS GIBERSON, OF CARIBOU, MAINE.

POTATO DIGGER.

Application filed April 16, 1926. Serial No. 102,472.

This invention relates to potato diggers of the horse drawn type and aims to provide a machine of that class having, among others, the novel features and improvements hereinafter described and claimed.

Referring to the drawings of one embodiment of my invention selected for description and illustration, Fig. 1 is a side elevation;

Fig. 2, a plan, with certain parts broken away or omitted for clearness;

Fig. 3, a partial view of the shaker and partial horizontal section on the line 3—3, Fig. 1, looking down;

Fig. 4, a partial detail plan showing some parts in section on the line 4—4, Fig. 1, also looking down;

Fig. 5, a vertical section on the line 5—5 Fig. 2, looking in the direction of the arrow with certain parts omitted for clearness;

Fig. 6, a vertical section on the line 6—6, Fig. 1, from the right with some parts omitted;

Fig. 7, a vertical section on the line 7—7, Fig. 1, also from the right, showing the bunching members in full, however;

Fig. 8, a partial horizontal section on the line 8—8, Fig. 1; and

Fig. 9, a detail plan of a part of the receiver showing its construction.

Referring first to Figs. 1 and 2, my novel potato digger comprises a frame 1, mounted on a pair of wheels 2 of convenient size, the frame having, near its forward end, an upwardly and forwardly extended yoke 3 by means of which the digger may be hauled by a horse or horses.

To the forward end of the frame 1, Figs. 1, 2, there is secured a downwardly inclined spade 4, comprising a flat sheet of metal, of sufficient length to extend down into the ground a few inches beneath the potato row, i. e., the vines, weeds and potatoes, to raise it sufficiently to enable it to readily slide upon the forward end of the elevator 6 to be described. In order to keep the potato vines and attached dirt with the potatoes from breaking apart and scattering, and the potatoes from getting under the digger wheels, the spade is also provided with sides 5, and has its front edge concave or rearwardly inclined, see Fig. 5, so that it may more easily be pushed into and under the row with less inclination to push the row ahead of it than would be the case if the front edges of the spade were straight.

At harvest time, the vines are from one foot to two and a half feet long, are heavy and lie across the row, and it has always ben a serious problem to force them up through the digger properly. For positioning the vines and weeds lengthwise or longitudinally of the row so that all of them more conveniently and surely may be picked up, and in a more compact mass fed into the digger by the spade, I provide, Figs. 1, 2, at the extreme forward end of a bar 7 pivoted at 8 on each side of the frame 1, a pointed plow or vine positioning member 9, which engages and positions the vines longitudinally of the row, the plow being pivoted to the bar 7 and yieldingly held in position by a spring 10 which, if the plow strikes a stone too large to be thrust aside by it, will permit the plow to yield backwardly and ride over the stone without stopping the digger.

For receiving and elevating the potatoes and vines from the spade, Figs. 1, 2, 5, there is provided the elevator 6 already referred to, which may comprise any form of endless chain 11 with cross bars or members 12 at frequent intervals and which travels over rolls 13 and sprockets 14 on shafts 15, 16 journaled in the inner faces of the opposite sides of the frame 1. The elevator is necessarily slack and hangs loosely over idler rolls 13₃ on the sides of the frame because rocks frequently fall between the elevator and rolls 13 and if the elevator were too tight, it would be broken or stopped by the rocks. The elevator 11 also travels over an elliptical gear 166 on the frame which gives the elevator an up and down movement which tends to sift the soil and small rocks between the slats or bars 12 to the ground. The shaft 16, Fig. 1, also carries on one end, a sprocket wheel 17 over which and below the idler 18 on the frame runs a chain 19 from the wheel 20 on the shaft 21 journaled in the rectangular section of the frame 1. This shaft 21, in turn, carries the sprocket wheel 22 which is driven by a chain 23 from a motor, not shown, and mounted on the flat motor seat 24 of the frame 1.

When using any digger, and particularly on a down grade, however, there is a great deal of trouble experienced from the potatoes and vines sliding backward and dropping off the elevator before they can be carried to the top, and to overcome this difficulty, Figs. 1, 2, 5, I have provided a pusher in the shape of an endless chain 25 on each side of the machine and within the frame 1 and connected at frequent intervals by slats 26, the slats carrying a strip of thick canvas 27, which pusher runs over sprockets 28, 29 carried by shaft 30 mounted in the bars 7 on the frame 1, and the shaft 31 in the frame, and a supporting sprocket 32 also on the frame 1. This pusher is so positioned as to height above the elevator 6 that the canvas and bars on the lower run will rest upon the tops of the vines and potatoes on the elevator with considerable weight, traveling in the same direction but slightly faster, and will push them upwardly and prevent them from rolling backward down and off the elevator and ensure their being carried to the top.

Preparatory to the action of the elevator, however, and in order that the vines and potatoes regularly and positively may be fed to and upon the elevator and not be pushed ahead of it, Figs. 1, 2, I provide a novel and herein spool shaped feed roll 33 on a shaft 34 near the forward ends of the bars 7 on the frame 1, and the roll is provided with ribs 35 which, with the inclined walls 36 of the roll draw the vines and weeds about the plows 9 and inwardly from the sides of the row and from each end of the roll and thus act upon the vines and potatoes, and sod covering the latter, to prevent them from breaking apart, and thus force them upon the elevator beneath the pusher.

This roll 33, Figs. 1, 2, is driven in the same direction that the digger travels by means of a sprocket wheel 37 on the shaft 34 and chain 38 from the wheel 39 on the shaft 40, the chain running also over the adjusting sprockets 41, 42, on the bars 7 and sprocket 43 which operates the pusher. The shaft 40, Fig. 1, also carries the larger sprocket wheel 44 which in turn is driven by the motor by means of the chain 19 already referred to. The bars 7 may be raised or lowered relative to the frame 1 to adjust the height of the feed roll 33, by means of a hand lever 45, and shaft 466 on the yoke 3, and links 47 on the bars 7, the lever 45 being provided with a spring 47' to assist in its operation.

The spring 47' also serves to counterbalance to some extent the weight of the roll 33 on the potato row, this weight being determined somewhat by the point on the lever 45 at which the spring 47' is secured to it. In order to be able to place still greater weight upon the feed roll 33 to increase its traction upon the row particularly when going down hill, I have provided also the foot pedal 46 by means of which the desired result can be obtained.

From the elevator, the vines and potatoes, together with any rocks and dirt remaining with them that failed to fall between the slats 12 of the elevator are delivered to the shaker 48 where the potatoes, vines, earth and small rocks are separated from each other. Heretofore the shaker has been placed forwardly of the rear end of the elevator to catch the vines and potatoes and necessarily a distance below the rear end of the elevator, to permit the movement of the shaker, and thus the potatoes and rocks were dropped into the shaker from so great a height that the potatoes were badly bruised and many were spoiled by the rocks. The best potato land is usually sandy and rocky with a large number of rocks, hence the great danger to the potatoes.

To avoid this difficulty, I have placed the shaker at the rear of the elevator and also much higher than is usually the case. To still further guard against bruising the potatoes I have also provided, Figs. 2, 5, a receiver or short conveyor 49 for the potatoes, vines and rocks, on which the material is dropped a few inches from the elevator. This conveyor, or receiver, Fig. 5, comprises an endless chain on each side of the frame running rearwardly over sprocket wheels 50, on shaft 51 and rolls 52 on shaft 53 journaled in the frame, the chains carrying slats or strips 54, Fig. 2, and operated by a chain 55 running over the wheel 56 on the shaft 51, the idler roll 57 in the frame and wheel 58 on the shaft 16 that carries the elevator 6, and from which shaft 16 the receiver is operated.

On this receiver the vines and potatoes are dropped from the elevator at a distance of only a few inches. To guard against breaking the receiver in case a small stone should fall between the rolls 52 and slats 54, the rear shaft 53, Fig. 8, is journaled in a block 553 which is yieldingly held against the rear end of a slot 544 in the frame by a spring 545, permitting the shaft to yield if necessary to avoid breaking the receiver. From the receiver the potatoes, stones and vines that do not fall between the slats 54 are dropped into the shaker.

The shaker, Figs. 1, 6, comprise an upright arched member 48 with rearwardly extended side bars 59, from which is swung by pivoted bars 60 reinforced and stiffened by angularly positioned bars 600 to prevent lateral vibratory movement of the shaker rear end, a bottom frame or head member 61 as an angle iron, with side bars 62 and from which bar 61, in turn, Fig. 3, extend rearwardly a row of long vine sifting and supporting rods 63, and below them potato supporting rods 64. The bottom flange 65 of the member 62, Fig. 6, is pivoted at 66 to a bar 67, the downwardly turned ends 68 of which have pivoted to them the ends of rocker bars 69, the opposite ends of which, in turn, Fig. 1, are pivoted to cranks 70 on a shaft 71 in the frame 1. On one end of the shaft 71, Fig. 5, is a sprocket 72 over which runs the chain 55 from the wheel 58 of the elevator shaft 16, which chain also runs over wheel 56 as already described.

Obviously by means of the construction described the shaker will be given a forward and backward rocking motion by the cranks 70 and bars 69 which will act to sift from the rods 63 any potatoes and small rocks still remaining mixed with them, the rocks and potatoes first falling on the rods 64 and later to the ground beneath. The shaker, Figs. 1, 7, is provided with side members 73 of convenient height to hold the vines, etc.

For collecting the vines and dumping them in piles periodically instead of singly and indiscriminately, I provide, Figs. 1, 2, 5, a novel construction as, for instance, on the bars 59, uprights 76, carrying a shaft 77 on which are bunching bars 78 hanging down to near the bottom of the shaker. The shaft 77 carries an arm 79 yieldingly held in position by a coil spring 80 on one upright 76.

The bars 78 collect in front of them the vines until the weight of the mass overbalances the tension of the spring 80 when it yields, the shaft 77 and bars 78 swing rearwardly and the mass of vines is dropped in a pile, thus depositing the vines in piles at intervals, making it much easier for the potato pickers to find the potatoes than would be the case if the potatoes were covered by the vines dropped promiscuously.

For ensuring the unimpeded and regular feeding of the vines toward the rear end of the shaker, Figs. 1, 2, 5, there is provided on the end of the frame 1 a shaft 83 bent to form crank like sections 84 on each of which is pivoted a lever 85 which I term a kicker member. These kickers are pivotally connected at their upper ends with long links 86 yieldingly connected to the motor base 24 of the frame so that as the shaft 83 is rotated the kickers regularly feed the vines rearwardly. The shaft 83, Fig. 1, carries a sprocket wheel 87 over which and the roll 88 and adjusting sprocket 89 in the frame, runs a chain 90 from a small sprocket 91 on shaft 16, and by means of which the kickers are operated.

The arch shaped end member 48 of the shaker, Fig. 1, is provided at its opposite sides with studs 92 which rest in slots 93 on opposite sides of the frame and thus the shaker may be raised or lowered about said studs by means of rods 94 connected at one end, Fig. 2, to a bar 95 pivoted to the top of member 48 and at their other ends to the lower arms 96, Fig. 1, of the lever 97 on the ends of the shaft 98 in the motor seat section 24.

To permit the vines and potatoes to be dropped at one side of the row, Fig. 4, and thus permit the digger to dig every row of the potatoes without driving over and injuring the potatoes, the shaker is also adjustable laterally relative to the frame by means of the studs 92 in the slots 93. This lateral swinging of the shaker, Fig. 1, is effected by means of the link 99 connecting one stud 92 with the arm 100 on one end of the shaft 101 in the frame. On the opposite side of the frame, Fig. 4, the opposite stud 92 is connected by the link 102 with the arm 103 on the opposite end of the shaft 101 which arm is connected by a link 104, Fig. 1, with the lever 105 so that when the lever is moved the link 99 will move one way while the opposite link 102 will move in the opposite way to swing the shaker to the left or right and permit the potatoes to drop at the side of the row.

From the bars 59 on the shaker, Fig. 1, depend bars 106 which carry a V-shaped scraper 107 which scrapes a shallow channel in the ground in which the potatoes will fall with less danger of scattering.

This invention is not limited to the particular embodiment thereof described and illustrated herein, but is more particularly pointed out in the following claims:

Claims:

1. A potato digger comprising, in combination a frame, a yielding row positioning member near the forward end thereof, a row lifting spade having a concave row contacting front edge, an elevator on the frame for receiving the row from the spade, and means including a motor and connecting members thereto for operating the elevator.

2. A potato digger comprising a frame, yielding row positioning members near the front end thereof, a row preserving and feeding member also on the frame between the positioning members to guide the row centrally thereunder, and a row lifting spade having a concave row contacting front edge to lift the row guided thereto by the positioning member, and an elevator receiving the row from the spade, means on the frame for operating the elevator and the row preserving and feeding member and means including a moving receiver at the elevated end of the row, and a shaker receiving the row from the receiver.

3. A potato digger comprising a frame, row positioning members thereon, a row feeding member between the positioning members for feeding the row centrally thereunder, and an elevator for carrying the potatoes directed to it by the feeding member; and a smooth surfaced row pusher on the frame for resting upon and frictionally pushing the row rearwardly of the machine while on the elevator, and means on the frame for operating the feeding member, elevator and pusher.

4. A potato digger comprising a frame, positioning members at the forward end thereof to position the vines in the row longitudinally of the machine, a row feeding member between the positioning members for feeding the row longitudinally and centrally of the frame, an elevator for elevating the row and a smooth surfaced row pusher thereover resting upon and frictionally pushing the row rearwardly, a traveling receiver in the rear of the elevator to receive the row therefrom; and a vertically adjustable and laterally swinging shaker adjacent the receiver for receiving the potatoes, and means on the frame for operating the feeding member, elevator, receiver and shaker.

5. A potato digger comprising a frame, yielding row positioning members at the forward end thereof, a motor-operated rotatable feeding member between the positioning members for feeding the row centrally of the digger, an elevator with a smooth surfaced row pusher thereover resting upon and frictionally pushing the row rearwardly for elevating the row; a swinging shaker with a vine buncher at the rear thereof, a vine kicker for kicking the vines toward the bunching member and means on the frame for operating the feeding member, elevator, row pusher and kicker.

6. A potato digger comprising a frame, row positioning members thereon, a rotatable beveled row feeder between the positioning members for feeding the row as positioned by the positioning members centrally into the machine; an elevator for elevating the row and a smooth surfaced row pusher thereover resting upon and frictionally to push the row rearwardly of the machine while being elevated, and means including a motor on the frame for operating the feeding member, elevator and pushing member.

7. A potato digger comprising a frame, a feeding member at the front end thereof for feeding the potato row centrally into the frame, a row raising elevator, a smooth surfaced row pushing member suspended above the elevator resting upon and frictionally for pushing the row rearwardly while it is being elevated; a receiver and swinging shaker also on the frame to receive the row from the receiver, a vine buncher acting intermittently to drop the vines in bunches, and means including a motor for operating the feeder, the elevator, the pusher member and shaker.

8. A potato digger comprising a frame, an elevator thereon for elevating the row, a cooperating smooth faced row pusher thereover constructed to have sliding frictional engagement with the row for pushing the row upwardly while it is being elevated, a laterally movable shaker adjacent the elevator, and a receiver on the frame above the shaker and below the top of the elevator to convey the row in a substantially horizontal direction to the shaker.

9. A potato digger comprising a frame, a motor operated rotating beveled row feeding member near the forward end thereof, a row raising elevator on the frame, a smooth faced row pusher resting upon and frictionally cooperating with the elevator to elevate the row intact; a swinging shaker with a buncher on the frame for receiving the row from the elevator, and distributing the contents, kickers in the shaker for kicking the vines toward the bunching member for delivering the vines in bunches intermittently.

10. A potato digger comprising a frame, a rotatable row feeding member for gathering the vines and feeding them rearwardly centrally of the digger, an elevator to receive the row from the feeder, a row pusher cooperating with the elevator for raising the row upwardly of the frame; a traveling receiver adjacent the elevator for receiving the row therefrom, a vibrating shaker on the frame adjacent the receiver with kickers in the shaker for kicking the vines therein rearwardly, and a vine buncher also on the frame for collecting the vines in bunches and delivering them intermittently from the digger.

11. A potato digger comprising a frame, a spool-shaped motor operated ribbed row feeding member on the frame, a spade having a rounded nose and with side members, on the frame adjacent the feeding member, and an elevator on the frame for elevating the row for delivery from the frame.

12. A potato digger comprising a frame, a motor operated row positioning member thereon between the longitudinal planes of the side edges of the elevator for positioning the vines of the row longitudinally of the digger, a spade on the frame for raising the row so positioned by the positioning member; an elevator on the frame elevating the row and a traveling smooth faced row pusher for resting upon and frictionally pushing the row rearwardly while it is being elevated, and means on the frame for depositing the row at either side of the path of travel of the digger; and row agitating means also on the frame.

13. A potato digger comprising a frame, a rotatable row feeder near the forward end thereof; an elevator on the frame for elevating the row, a traveling receiver for receiving the row from the elevator and a vibrating shaker on the frame in the rear of the receiver for separating the dirt and rocks from the rest of the row, and a kicking member for kicking the row rearwardly from the receiver into the shaker.

14. A potato digger comprising a frame having a row feeding member thereon, for compressing the material comprising the row and feeding it centrally of the frame; an elevator on the frame for elevating the row, a pusher cooperating with the elevator to push the row upwardly as it is being elevated, a yieldingly mounted receiving member for receiving the row from the elevator; a vibrating and swinging shaker with a buncher therein for bunching the vines of the frame and delivering them in bunches intermittently at one side of the digger.

15. A potato digger comprising a frame with a row condensing and feeding member thereon, an elevator on the frame, a row pusher also on the frame and cooperating with the elevator to push the material while it is being elevated; a traveling receiving member adjacent the elevator for receiving the row therefrom, a swinging shaker with a vine buncher and kicker therein adjacent the receiver for bunching the vines and delivering them so bunched; and a scraper for scraping a channel in the earth to receive the potatoes.

16. In a potato digger, a counterbalanced row holding and feeding roller, a motor and means connecting it and the roller for operating the latter, and means capable of operation by the hand or foot for controlling said roller as to position, and increasing its traction power upon the roller.

In testimony whereof I have signed my name to this specification.

THOMAS GIBERSON.